United States Patent
Streich

(10) Patent No.: US 10,941,054 B2
(45) Date of Patent: Mar. 9, 2021

(54) METHOD AND DEVICE FOR PREPARING A FLUID LOADED WITH INGREDIENTS

(71) Applicant: SKF Marine GmbH, Hamburg (DE)

(72) Inventor: Olaf Streich, Hamburg (DE)

(73) Assignee: SKF MARINE GMBH, Hamburg (DE)

( * ) Notice: Subject to any disclaimer, the term of this patent is extended or adjusted under 35 U.S.C. 154(b) by 419 days.

(21) Appl. No.: 15/506,815

(22) PCT Filed: Aug. 5, 2015

(86) PCT No.: PCT/EP2015/068053
§ 371 (c)(1),
(2) Date: Feb. 27, 2017

(87) PCT Pub. No.: WO2016/030160
PCT Pub. Date: Mar. 3, 2016

(65) Prior Publication Data
US 2017/0253498 A1    Sep. 7, 2017

(30) Foreign Application Priority Data

Aug. 28, 2014   (DE) ...................... 10 2014 217 224.1

(51) Int. Cl.
*C02F 1/36* (2006.01)
*C02F 1/32* (2006.01)
(Continued)

(52) U.S. Cl.
CPC ............. *C02F 1/325* (2013.01); *C02F 1/36* (2013.01); *C02F 1/385* (2013.01);
(Continued)

(58) Field of Classification Search
CPC .. C02F 1/325; C02F 1/36; C02F 1/385; C02F 2201/3227; C02F 2303/04; C02F 2301/026; C02F 2103/008
See application file for complete search history.

(56) References Cited

U.S. PATENT DOCUMENTS

| 4,400,270 A | 8/1983 | Hillman |
| 4,661,264 A | 4/1987 | Goudy, Jr. |

(Continued)

FOREIGN PATENT DOCUMENTS

| CN | 101300195 A | 11/2008 |
| DE | 202012009221 U1 | 1/2013 |

(Continued)

OTHER PUBLICATIONS

JP 2011189240 A Translation, Cyclone Type Water Treatment Device; Sep. 29, 2011 ; Takeda, Satoshi (Year: 2011).*

(Continued)

*Primary Examiner* — Cameron J Allen
(74) *Attorney, Agent, or Firm* — J-Tek Law PLLC; Scott T. Wakeman; Mark A. Ussai

(57) ABSTRACT

A method for treating a liquid loaded with ingredients includes injecting the liquid into a reactor vessel such that a circular movement is imparted to the liquid and such that a concentration of the ingredients in a region of a peripheral wall of the reactor vessel increases in a direction from a reactor inlet to a reactor outlet, impinging ultrasound waves having a first intensity and/or ultraviolet radiation having a first intensity on the liquid in a first portion of the reactor vessel, and impinging ultrasound waves having a second intensity and/or ultraviolet radiation having a second intensity on the liquid in a second portion of the reactor vessel. The concentration of the ingredients in the first portion is less than the concentration of the ingredients in the second portion and the first intensity is less than the second intensity. Also a reactor vessel.

15 Claims, 4 Drawing Sheets

(51) Int. Cl.
*C02F 1/38* (2006.01)
*C02F 103/00* (2006.01)

(52) U.S. Cl.
CPC .. *C02F 2103/008* (2013.01); *C02F 2201/326* (2013.01); *C02F 2201/3227* (2013.01); *C02F 2209/005* (2013.01); *C02F 2301/026* (2013.01); *C02F 2303/04* (2013.01)

(56) References Cited

U.S. PATENT DOCUMENTS

| | | | |
|---|---|---|---|
| 2002/0096648 A1* | 7/2002 | Kaiser | A23L 3/28 |
| | | | 250/492.1 |
| 2004/0045886 A1* | 3/2004 | Abe | C02F 1/325 |
| | | | 210/198.1 |
| 2005/0258085 A1 | 11/2005 | Hiroe et al. | |
| 2008/0203004 A1 | 8/2008 | Abe et al. | |
| 2009/0081340 A1 | 3/2009 | Forney | |
| 2010/0326114 A1 | 12/2010 | Kim et al. | |
| 2011/0024646 A1 | 2/2011 | Abe et al. | |
| 2011/0210266 A1* | 9/2011 | Coulter | C02F 1/008 |
| | | | 250/432 R |
| 2013/0078702 A1* | 3/2013 | Dhanasekharan | A61L 2/0047 |
| | | | 435/173.3 |
| 2013/0319925 A1 | 12/2013 | Yee et al. | |

FOREIGN PATENT DOCUMENTS

| | | |
|---|---|---|
| DE | 202012009220 U1 | 3/2013 |
| DE | 102012018995 A1 | 3/2014 |
| DE | 102012018996 A1 | 3/2014 |
| EP | 2166260 A1 | 6/2010 |
| EP | 2199260 A1 | 6/2010 |
| JP | H05192655 A | 8/1993 |
| JP | 2003003175 A | 1/2003 |
| JP | 2006121031 A | 5/2006 |
| JP | 2007245097 A | 9/2007 |
| JP | 2011189240 A | 9/2011 |
| KR | 20020053699 A | 7/2002 |
| KR | 100785703 B1 | 12/2007 |
| WO | 2004037301 A2 | 5/2004 |
| WO | 2004037301 A3 | 1/2005 |
| WO | WO-2012114027 A1 * | 8/2012 ................ C02F 1/32 |

OTHER PUBLICATIONS

Communication from the German Patent Office dated Mar. 31, 2015 in related German application No. 10 2014 217 224.1, and partial translation thereof.

Office Action from the Japanese Patent Office dated Aug. 26, 2019 in related Japanese application No. 2017-530414, and translation thereof.

Translation of Office Action and Search Report from the Chinese Patent Office dated Feb. 3, 2020 in related Chinese No. 201580046078.

Office Action and Search Report from the Chinese Patent Office dispatched Jun. 23, 2020 in related Chinese Application No. 201580046078, and translation thereof.

\* cited by examiner

METHOD AND DEVICE FOR PREPARING A FLUID LOADED WITH INGREDIENTS

CROSS-REFERENCE

This application is the U.S. National Stage of International Application No. PCT/EP2015/068053 filed on Aug. 5, 2015, which claims priority to German patent application no. 10 2014 217 224.1 filed on Aug. 24, 2014.

TECHNOLOGICAL FIELD

The disclosure relates to a method for treating a liquid loaded with ingredients as well as a device for carrying out the method.

BACKGROUND

Various chemical and physical methods are used for the treating of liquids loaded with solids or microorganisms. In particular in the field of physical methods, filters and centrifugal separators are used in order to separate unwanted components of a liquid. In order that microorganisms are not only separated or filtered, but also killed, an irradiation with ultrasound waves or ultraviolet light (UV) often takes place.

From DE 20 2012 009 220 U1 a centrifugal separator is known that impinges liquid loaded with microorganisms with ultrasound upon entering into a reactor vessel. Here an ultrasound sonotrode is disposed frontally in the inflow region and serves as guide element. The liquid is guided between the ultrasound sonotrode and the wall of the centrifugal separator and is actively or passively set into rotation. The denser components of the liquid, which denser components are treated with ultrasound, are radially displaced here in the peripheral region of the centrifugal separator and separated.

In addition to the difficult technical implementation of this centrifugal separator, the dwell time of the respective liquid in the described ultrasound region is short. Furthermore, for an efficient treatment the loaded liquid must be exposed to an ultrasound wave field for at least a defined time. In order that the described device can effectively kill microorganisms, the sonotrode must have high power or the liquid volume inflowing into the centrifugal separator must be small.

EP 2199260 A1 shows a tubular device for treating of loaded liquids. Here the introduced liquid flows through a reactor vessel and is impinged with ultrasound waves and ultraviolet rays during the flow-through. The arrangement of the ultrasound sonotrodes and the UV emitters is chosen here such that the through-flowing liquid must flow around the UV emitters and becomes turbulent due to ultrasound waves. However, with this possibility of the treatment of a loaded liquid the liquid must be separated from the solids or the killed microorganisms in a further method step. In addition, the concentration of the components of the liquid changes along the device from EP 2199260 A1. Much power is thereby lost, since due to the turbulences a clear location-dependent treatment of the liquid is not possible.

Further prior art is known from, among others, the publications DE 20 2012 009 221, DE 10 2012 018 996, and DE 10 2012 018 995.

SUMMARY

An aspect of the disclosure is to provide a method without the mentioned disadvantages and which makes possible an effective treatment of a liquid loaded with ingredients. Furthermore an aspect of the disclosure is to provide a device for carrying out the inventive method.

In a method for treating a liquid loaded with ingredients the loaded liquid is moved in a reactor vessel in a circular movement and impinged (irradiated) with ultrasound waves and/or ultraviolet radiation. According to the disclosure a local radiation intensity is adapted to a specific concentration of the ingredients in the liquid, wherein in a region with a high specific concentration the local radiation intensity is set higher than in a region with a low specific concentration.

It has been recognized that by setting the liquid with the ingredients contained therein into rotation, a specific concentration of the ingredients in the reactor vessel, dependent on, among other things, the reactor vessel and the flow-through direction, and largely to be expected, is established. Depending on the rotational speed and density of the liquid and the ingredients that are in the introduced liquid, during the rotation the ingredients are displaced to different degrees into a peripheral region of the reactor vessel. Due to the inventive irradiation depending on the specific concentration distribution, an efficient adapting to the operating conditions and thus the specific concentration distribution in the reactor container can therefore be effected.

In an advantageous exemplary embodiment, with a high specific concentration of the ingredients an irradiation depth of the local irradiation intensity is set smaller than with a low specific concentration. Depending on the rotational speed of the loaded liquid a centrifugal force directed radially away from a (quasi) rotational axis of the rotational movement, i.e., radially outward, acts on the ingredients of the liquid, so that the specific concentration of the ingredients of the liquid loaded with the ingredients increases toward the periphery of the reactor vessel. In particular in the area of influence of the loaded liquid the ingredients are relatively uniformly distributed and thus present in a small specific concentration. It is advantageous here to set the irradiation intensity low, however to allow it to act as deeply as possible toward the rotational axis of the rotational movement of the liquid. In the region of the outlet a centrifugal force acts on the ingredients for a defined time. The ingredients are to be found in the outer peripheral regions of the loaded liquid set into rotation, with the result that a highest-possible radiation intensity that acts in its direct vicinity achieves optimal results. Between these two states a continuous change of the specific concentration prevails, with the result that the irradiation intensity can be set and optimized according to this physical principle.

According to a further advantageous embodiment, the irradiation is directed radially from the periphery of the reactor vessel inward toward the axis of rotation of the loaded liquid in the reactor vessel. Due to these measures the ultrasound sonotrodes or UV emitters can be particularly simply attached on or in the walls of the reactor vessel.

According to an advantageous exemplary embodiment the liquid loaded with ingredients is tangentially led into and/or discharged from the reactor vessel. This measure makes possible a passive setting of the introduced liquid into rotation without the aid of actively driven devices.

A device for carrying out the inventive method for treating a liquid loaded with ingredients comprises a reactor vessel for guiding the liquid, a supply line, and an outlet line for supplying or discharging the liquid, and radiation sources disposed on or in the reactor vessel directed into the reactor vessel for generation of ultrasound waves and/or UV rays having a local irradiation intensity. According to the invention the device for setting the local irradiation intensity has a changing radiation-source density in the direction of a rotation axis and/or in a circumferential direction, with the result that the local radiation intensity is adapted to a specific concentration of the ingredients in the liquid, wherein with a high specific concentration the local irradiation intensity is higher than with a low specific concentration.

Preferably the reactor vessel is configured cylindrical and has inlets and outlets disposed tangentially on its outer surface for moving the loaded liquid in a rotational movement. The radiation sources generate ultrasound waves and/or UV rays having a defined irradiation power or irradiation intensity and thus impinge the liquid flowing through the reactor vessel. Due to the tangential arrangement of the inlets and outlets the liquid is set into rotation with the result that a defined specific concentration distribution of the solids and microorganisms contained in the liquid is set. The specific concentration distribution can be both concentration per volume and concentration per mass and describes the concentration of the ingredients in the liquid based on an infinitesimal spatial section of the liquid in the reactor vessel. The specific concentration arising in the reactor vessel is proportionally dependent on the rotational speed and the rotation duration of the loaded liquid. A centrifugal force must therefore act on the ingredients contained in the loaded liquid for a certain time duration so that the ingredients are displaced into the peripheral region of the reactor vessel. This time duration can be reduced by a higher rotational speed and thus higher centrifugal forces. A high specific concentration thereby arises in the peripheral regions of the reactor vessel in the regions with high rotational speed or after a relatively long rotation duration. In order that the loaded liquid is effectively treated, the radiation sources are adapted in their irradiation power or irradiation intensity to the rotational speed or to the dwell time of the ingredients in the reactor vessel and thus to the specific concentration of the ingredients in the loaded liquid. The energy required for treating the loaded liquid can thereby be exactly dosed, with the result that the efficiency of the system increases. Preferably the radiation sources are attached on or in the casing-surface-side wall (reactor wall) of the reactor vessel. However, the radiation sources can also be disposed in the reactor vessel volume or in the inlets and outlets.

In one exemplary embodiment the irradiation intensity is set by identical radiation sources having a radiation-source density changing in the direction of the rotational axis. By this measure the irradiation intensity of the radiation sources disposed on the reactor wall is realized by an increased number of radiation sources. In this embodiment the distances of the radiation sources to each other is smaller along the rotational axis of the rotation of the liquid, i.e., in the vertical direction, with the result that the reactor wall in this region can receive more radiation sources.

According to a further exemplary embodiment the local irradiation intensity is set by identical radiation sources having a radiation-source density changing in the circumferential direction. By this measure the distances of the radiation sources to one another along the circumference of the outer surface is smaller, with the result that the reactor wall in this region can receive more radiation sources and the irradiation intensity thereby increases regionally.

According to one exemplary embodiment the local irradiation intensity is set by radiation sources having different powers. A setting of the irradiation intensity by the number of radiation sources can only be effected in a manufacturing process of the reactor vessel. In particular, if a flexible adapting of the irradiation intensity is necessary, it is advantageous to be able to adapt the power of the individual radiation sources manually or automatically to the respective specific concentrations of the liquid in the reactor container.

In one advantageous embodiment the local irradiation intensity is set by radiation sources having different powers and having a radiation-source density changing in the circumferential direction and/or in the direction of the rotational axis. Due to this measure the greatest possible flexibility in the treating of a liquid loaded with ingredients is achieved.

According to one exemplary embodiment, in the installation position of the reactor vessel the inlet is upward and the outlet downward on the rector vessel, or vice-versa. The introduced liquid can thereby be directed circularly through the entire volume of the reactor vessel, with the result that the entire reactor wall can be used for the treating of the liquid using ultrasound and/or UV rays. Preferably the inlets and/or outlets are disposed tangentially on the reactor wall so that an introduced liquid is already set into rotation by this arrangement without further aids.

Other advantageous exemplary embodiments are the subject matter of further dependent claims.

In the following, preferred exemplary embodiments of the invention are explained in more detail with reference to greatly simplified schematic depictions.

DETAILED DESCRIPTION

Figure 1:
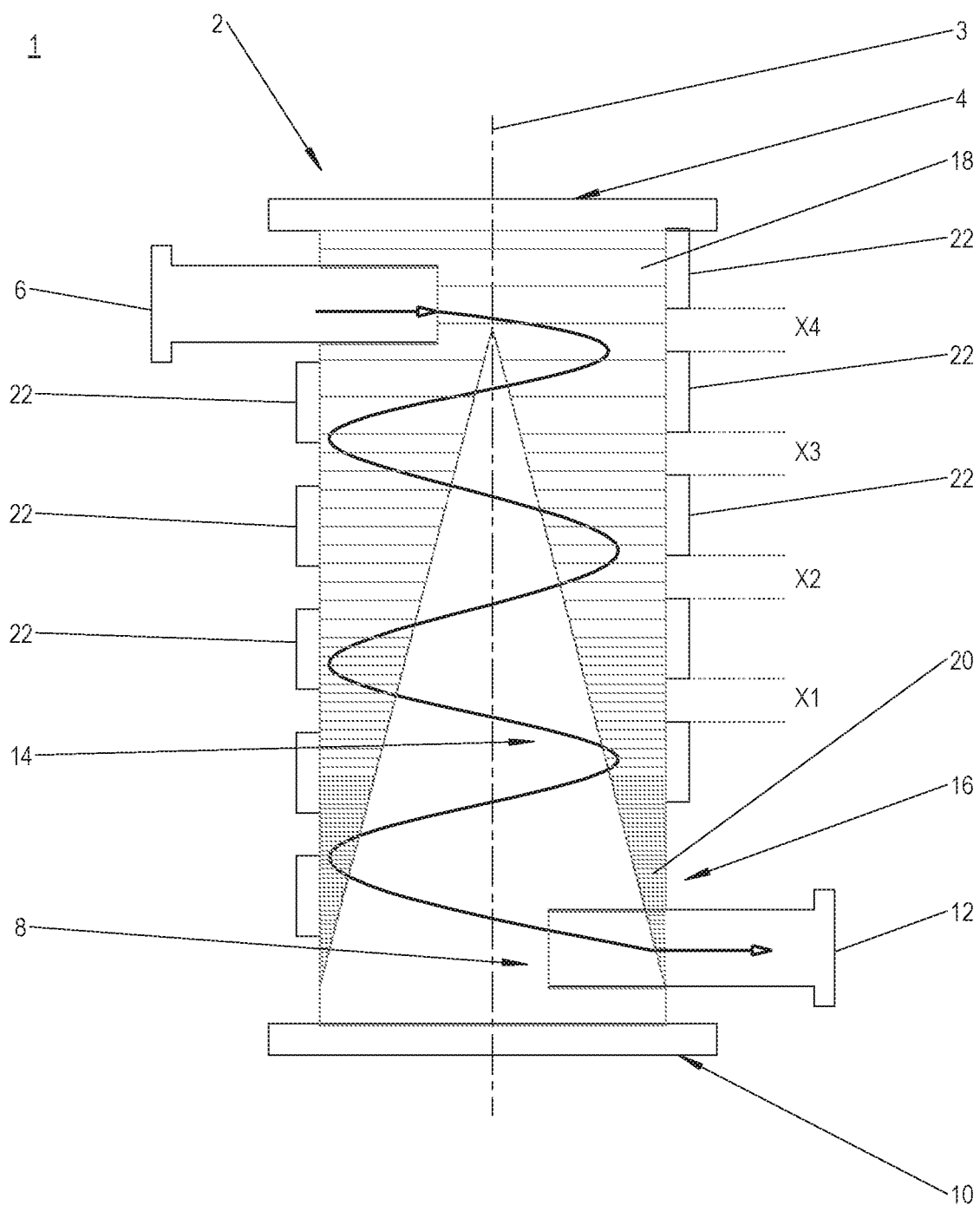
FIG. 1 shows a longitudinal section of a first inventive exemplary embodiment.

In the drawings the same structural elements each have the same reference number.

FIG. 1 shows a longitudinal section through an inventive device 1 for treating a liquid 8 loaded with ingredients. The device 1 is suited, for example, for treating of ballast water in watercraft such as container ships. The device 1 here has a cylindrical reactor vessel 2 for receiving the liquid 8.

The reactor vessel 2 has an interior that is delimited by a cylindrical reactor casing or reactor wall 16, a reactor cover 4, and a reactor base 10. The reactor vessel 2 is basically rotationally symmetric with respect to its cylinder axis 3. In the region of the reactor cover 4 the reactor vessel 2 includes an inlet 6 that opens tangentially into the interior. A liquid can be led into the reactor vessel 2 through the inlet 4. In the region of the reactor base 10 an outlet 12 is disposed that extends tangentially out of the interior and makes it possible for the liquid 8 to flow out from the reactor vessel 2.

Radiation sources 22 for destruction of ingredients or sterilization of the liquid 8 are disposed on the reactor casing 16. In this exemplary embodiment they are distributed uniformly in the circumferential direction and in the direction of the cylinder axis 3 and directed here in the radial direction toward the cylinder axis 3. In this exemplary embodiment the radiation sources 22 are embodied as ultrasound sonotrodes, however they can also be UV lamps or comparable equipment for generating of ultrasound waves and/or ultraviolet radiation. Here the radiation sources 22 are disposed in circumferential rows that have a defined identical spacing $x1=x2=x3=x4$ with respect to one another vertically.

The reactor vessel 2 is continuously flowed-through by the liquid 8, wherein due to the tangential arrangement of the inlet 6 and of the outlet 12 the liquid 8 is set into rotation 14. A rotational movement is thus imposed on the liquid 8 and with it the ingredients. In a cylindrically configured reactor vessel 2 the cylinder axis 3 thus corresponds to the rotational axis 3 of the introduced liquid 8 set into rotation 14. Due to a centrifugal force acting on the ingredients due to the rotational movement the ingredients contained in the liquid 8 are driven radially outward toward a reactor wall 16 of the reactor vessel 2. Consequently a displacement, dependent on the rotational speed and a rotation duration of the liquid 8, of the ingredients (such as solids or microorganisms) contained in the liquid onto the reactor wall 16 of the reactor vessel 2 arises. The specific concentration of the ingredients in the liquid 8 near the casing-surface-side wall 16 is thus low 18 near the inlet 6 and high 20 in the region of the outlet 12. The radiation sources 22 are more powerfully embodied here in the region with higher specific concentration 20 of ingredients in the liquid 8 than in regions with lower specific concentration 18. Regions with higher specific concentration 20 are thereby impinged (irradiated) with a higher irradiation intensity than regions with lower specific concentration 18 of ingredients in the liquid 8. According to the exemplary embodiment the power of the radiation sources therefore increases continuously toward the reactor base 10.

Figure 2:
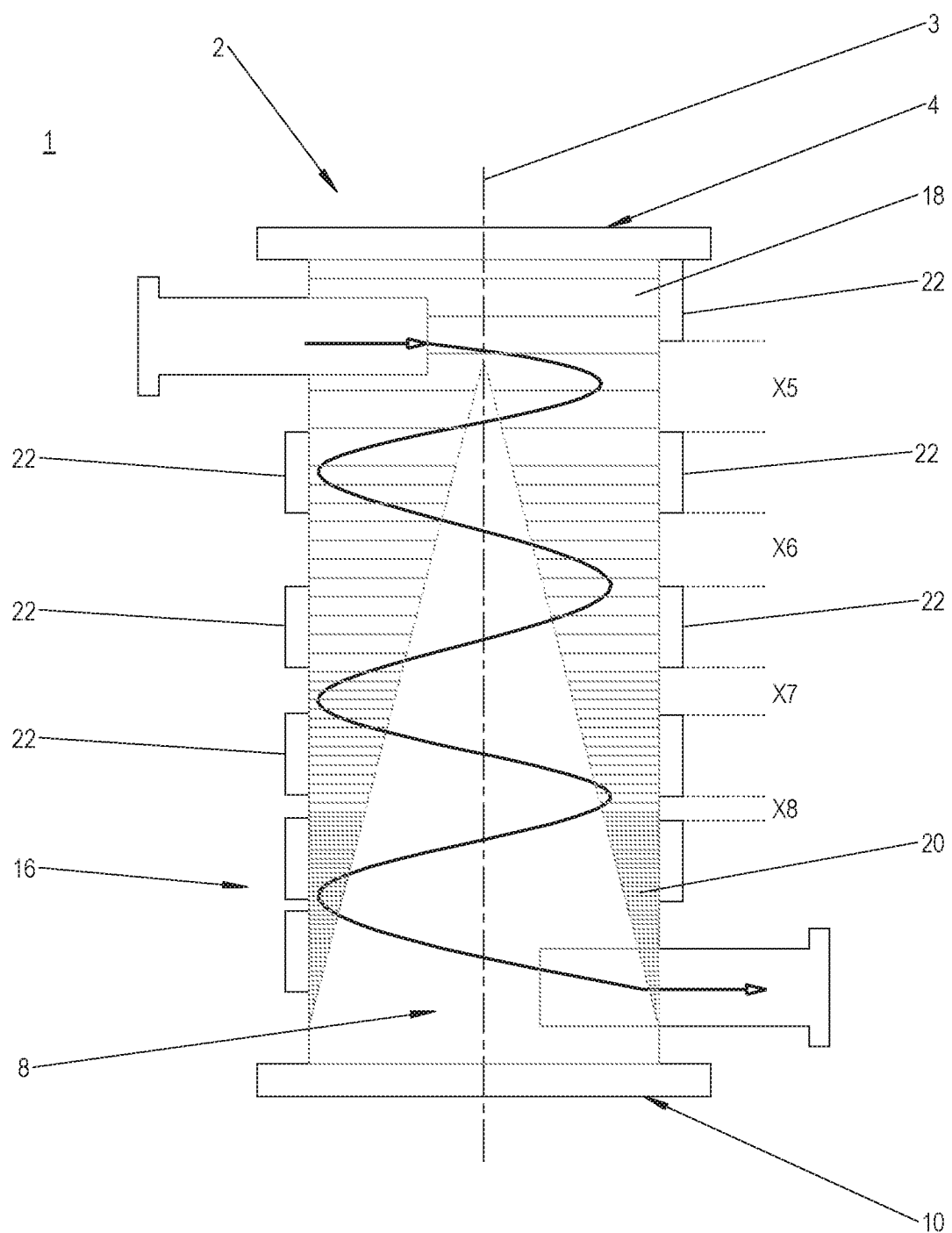
FIG. 2 shows a longitudinal section of a second inventive exemplary embodiment.

In FIG. 2 a longitudinal section of the cylindrical reactor vessel 2 along its cylinder axis 3 is shown according to a second exemplary embodiment. The essential difference to the first exemplary embodiment is that the radiation sources 22 disposed on the reactor wall 16 in circumferential rows have a changing vertical distance to one another. In the second exemplary embodiment the vertical distance $x5$-$x8$ of the radiation sources 22 to one another decreases in the direction of the reactor base 10 of the reactor vessel 2. Consequently the relation $x5 > x6 > x7 > x8$ results. The liquid 8 passing the reactor vessel 2 is thereby impinged with a varying irradiation intensity along the vertical extension of the reactor vessel 2. The varying irradiation intensity of the radiation sources 22 is adapted to the specific concentration 18, 20 (hatching) of the ingredients in the liquid 8 in the immediate vicinity of the reactor wall 16. The higher the specific concentration of the ingredients in the liquid 8, the more radiation sources 22 impinge it with ultrasound waves and/or UV radiation and vice versa. The irradiation intensity here is proportional to the number of radiation sources 22.

Figure 3:
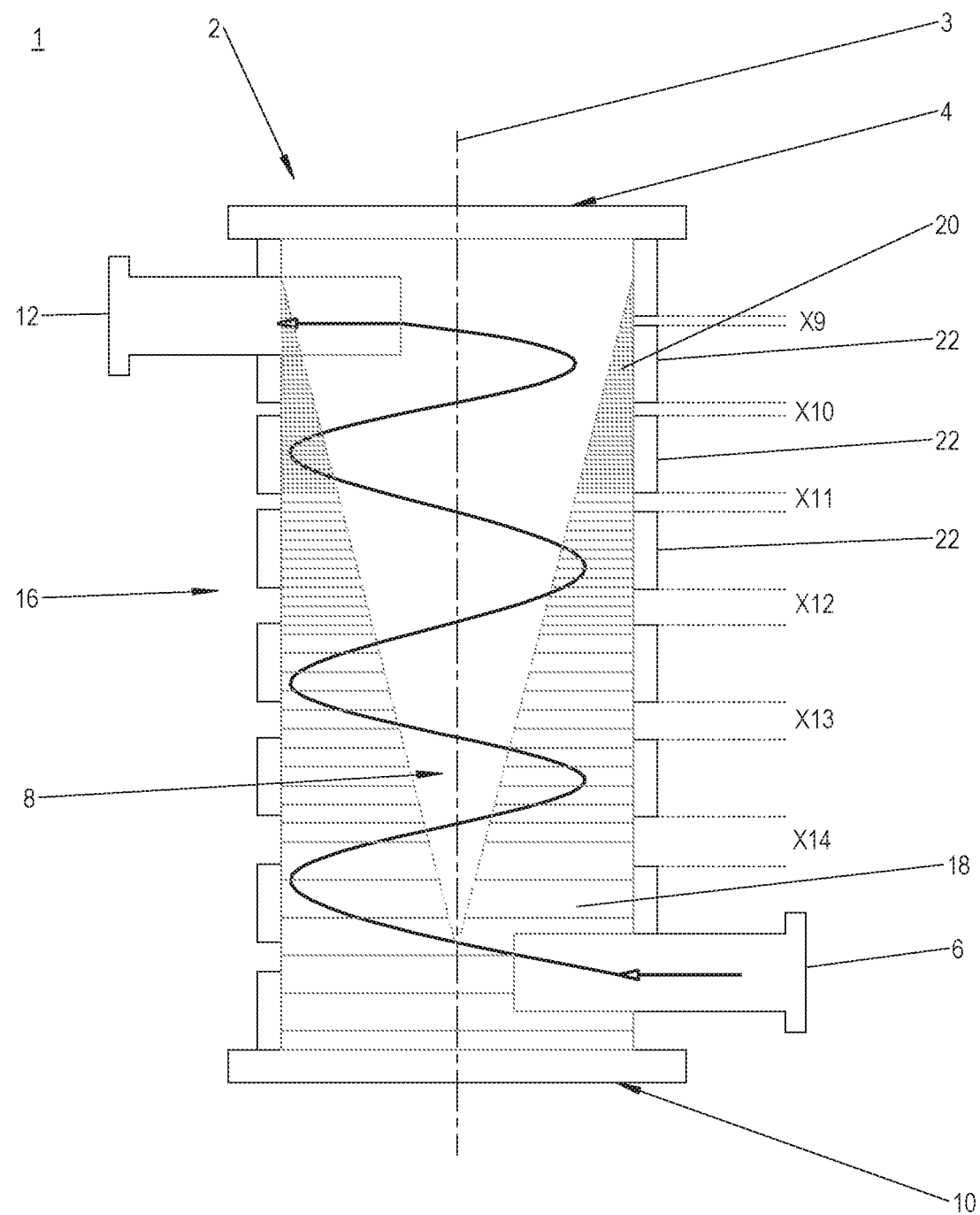
FIG. 3 shows a longitudinal section of a third inventive exemplary embodiment.

FIG. 3 illustrates a longitudinal section of the cylindrical reactor vessel 2 along its cylindrical axis 3 according to a third exemplary embodiment. In particular there is a difference to the first and the second exemplary embodiment in the reversed arrangement of the inlet 6 and the outlet 12. Here the liquid 8 reaches into the region of the base plate 10 in the reactor vessel 2 and leaves it in the region of the reactor cover 4. Accordingly the specific concentration 18, 20 of the ingredients in the liquid 8 increases in the vicinity of the reactor wall 16 vertically toward the reactor cover. The radiation sources 22 disposed on the reactor wall 16 are adapted to this specific concentration distribution. The vertical distances $x9$-$x14$ of the radiation sources to one another increase with a decrease of the specific concentration toward the reactor base 10. In the third exemplary embodiment a relative ratio $x9 < x10 < x11 < x12 < x13 < x14$ of the distances to one another results.

Figure 4:
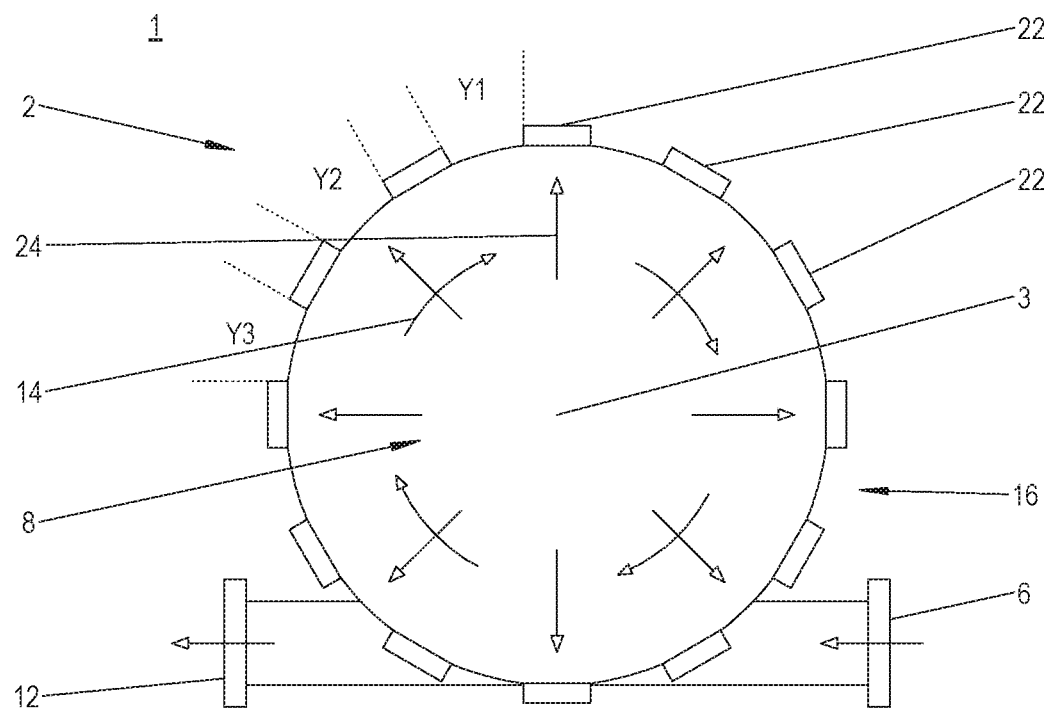
FIG. 4 shows a cross-section of the first exemplary embodiment.

In FIG. 4 the first exemplary embodiment is illustrated in the cross-section of the reactor vessel 2 perpendicular to its cylindrical axis 3. The radiation sources 22 are disposed circumferentially in the vertical direction on a plane on the reactor wall. The radiation sources 22 have a constant distance $y1=y2=y3$ to one another in the circumferential direction and are radially oriented toward the cylinder axis 3 in the reactor vessel 2. The liquid 8 loaded with ingredients introduced at the tangentially disposed inlet 6 is set into rotation 14. With the vertical flow-through of the reactor vessel 2 the ingredients of the loaded liquid 8 are increasingly strongly displaced toward the reactor wall 16.

Figure 5:
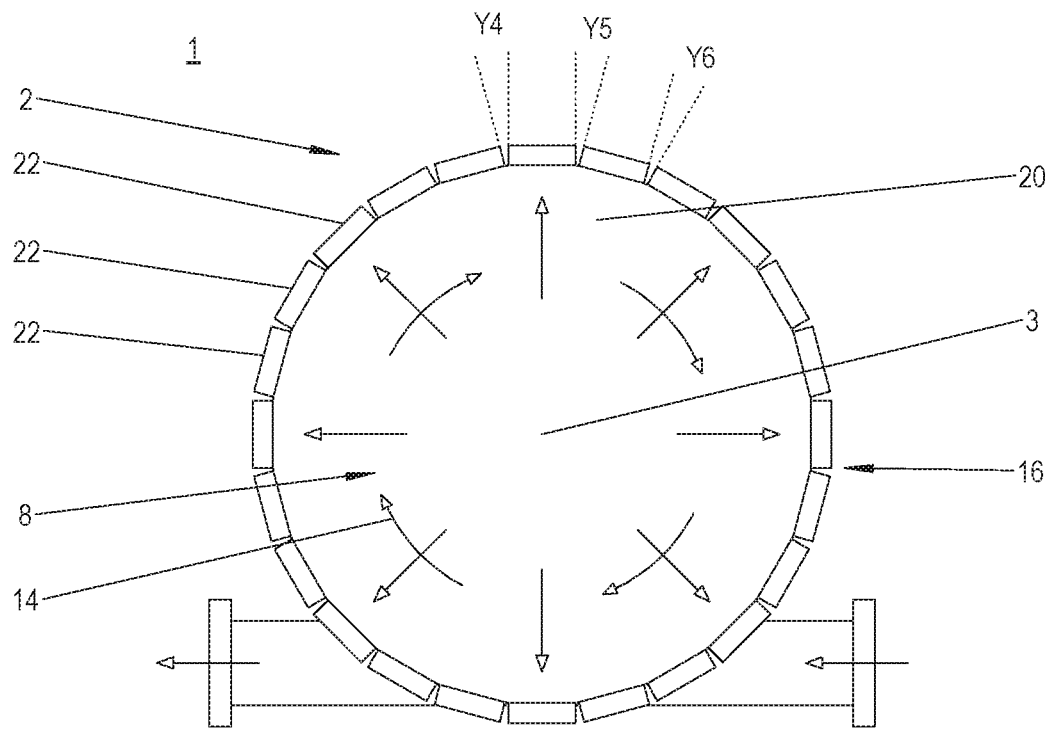
FIG. 5 shows a cross-section of a fourth exemplary embodiment.

FIG. 5 shows a the fourth exemplary embodiment in the cross-section of the reactor vessel 2; here the cross-section extends perpendicular to the cylinder axis 3 in a vertical plane of the reactor vessel 2 in the immediate vicinity to the reactor wall 16, at which a high specific concentration of ingredients 20 in the liquid 8 is set. In this exemplary embodiment the irradiation intensity is also realized by a higher number of radiation sources 22, however they are not disposed closer to each other vertically, but rather in a circumferential direction. The circumferential distances $y4=y5=y6$ of the radiation sources 22 to one another here are smaller than in a vertical plane of the reactor vessel 2 with a lower specific concentration of ingredients 18 in the liquid 8. However, in an analogous manner to the second exemplary embodiment, in the fourth exemplary embodiment the vertical distances of the radiation sources 22 to one another can also vary.

A method is disclosed for treating a liquid 8 loaded with ingredients. This liquid 8 is set into a circular movement 14 in a reactor vessel 2 and impinged with ultrasound waves and/or ultraviolet radiation 22. A local irradiation intensity is adapted to a specific concentration 18, 20 of the ingredients in the liquid, wherein with a high specific concentration 18, 20 the local irradiation intensity is higher than with a low specific concentration. Furthermore, a device 1 for carrying out the method is disclosed.

REFERENCE NUMBER LIST

1 Device
2 Reactor vessel
3 Cylinder axis or rotational axis
4 Reactor cover
6 Inlet
8 Liquid loaded with ingredients
10 Reactor base
12 Outlet
14 Rotational direction of the liquid
16 Reactor wall
18 Region of low specific concentration
20 Region of high specific concentration
22 Radiation source
24 Displacement direction of the ingredients
x Distances in the direction of the rotational axis
y Circumferential distances

The invention claimed is:

1. A method for treating a liquid loaded with ingredients comprising:
    injecting the liquid into a reactor vessel such that a circular movement is imparted to the liquid and such that a concentration of the ingredients in a region of a peripheral wall of the reactor vessel increases in a direction from a reactor inlet to a reactor outlet;

impinging ultrasound waves having a first intensity and/or ultraviolet radiation having a first intensity on the liquid in a first portion of the reactor vessel; and impinging ultrasound waves having a second intensity and/or ultraviolet radiation having a second intensity on the liquid in a second portion of the reactor vessel;

wherein the concentration of the ingredients in the first portion of the reactor vessel is less than the concentration of the ingredients in the second portion of the reactor vessel;

wherein the first intensity is less than the second intensity, and wherein the first portion of the reactor vessel comprises a first volume of the reactor vessel extending axially from the reactor inlet to a location between the reactor inlet and the reactor outlet and the second portion of the reactor vessel comprises a second volume of the reactor vessel extending axial from the location to the reactor outlet.

2. The method according to claim 1, wherein impinging the ultrasound waves having the first intensity and/or the ultraviolet radiation having the first intensity on the liquid comprises impinging the ultrasound waves having the first intensity and/or the ultraviolet radiation having the first intensity on the liquid in a radially inward direction.

3. The method according to claim 1, wherein the liquid is injected and/or discharged from the reactor vessel tangentially.

4. The method according to claim 1, wherein the circular movement of the liquid includes the circular movement of at least a portion of the liquid along the interior wall of the reactor vessel.

5. The method according to claim 1, wherein an interior of the reactor vessel is free from obstructions that would interfere with the circular movement.

6. A method for treating a liquid loaded with ingredients comprising:

injecting the liquid into a reactor vessel such that a circular movement is imparted to the liquid and such that a concentration of the ingredients in a region of a peripheral wall of the reactor vessel increases in a direction from a reactor inlet to a reactor outlet;

impinging ultrasound waves having a first intensity and/or ultraviolet radiation having a first intensity on the liquid in a first portion of the reactor vessel; and impinging ultrasound waves having a second intensity and/or ultraviolet radiation having a second intensity on the liquid in a second portion of the reactor vessel;

wherein the concentration of the ingredients in the first portion of the reactor vessel is less than the concentration of the ingredients in the second portion of the reactor vessel;

wherein the first intensity is less than the second intensity;

wherein impinging the ultrasound waves having the first intensity and/or the ultraviolet radiation having the first intensity on the liquid comprises impinging the ultrasound waves having the first intensity and/or the ultraviolet radiation having the first intensity on the liquid to a first depth, wherein impinging the ultrasound waves having the second intensity and/or the ultraviolet radiation having the second intensity on the liquid comprises impinging the ultrasound waves having the second intensity and/or the ultraviolet radiation having a second intensity on the liquid to a second depth, and wherein the first depth is greater than the second depth.

7. A device for treating a liquid loaded with ingredients comprising:

a reactor vessel having an inlet and an outlet and a cylindrical inner surface configured to guide a liquid injected tangentially into the reactor vessel in a circular movement from the inlet to the outlet; and a plurality of ultrasound radiation sources and/or ultraviolet radiation sources disposed circumferentially around and axially along the cylindrical inner surface, a first set of the radiation sources being located in a first section of the reactor vessel and a second set of the radiation sources being located in a second section of the reactor vessel different than the first section;

wherein the first set of radiation sources is configured to produce a first level of a radiation intensity in the first section of the reactor vessel, wherein the second set of radiation sources is configured to produce a second level of radiation intensity in the second section of the reactor vessel, the second level being greater than the first level, wherein the first set of the radiation sources is located axially between the second set of radiation sources and the inlet, and wherein a number of the first set of radiation sources per a unit area on the cylindrical inner surface is less than a number of the second radiation sources per the unit area on the cylindrical surface.

8. The device according to claim 7, wherein a power of the radiation sources of the first set of radiation sources is different than a power of the radiation sources of the second set of radiation source.

9. The device according to claim 7, wherein the inlet is located above the outlet in an axial direction.

10. The device according to claim 7, wherein the inlet is located below the outlet in an axial direction.

11. The device according to claim 7, wherein the reactor vessel is cylindrical and wherein each radiation source of the first set of radiation sources lies along a surface of the cylindrical reactor vessel.

12. The device according to claim 7, wherein the reactor vessel is cylindrical and wherein each radiation source of the first set of radiation sources faces an axis of the cylindrical reactor vessel.

13. The device according to claim 7, wherein the reactor vessel is cylindrical and wherein each radiation source of the first set of radiation sources faces into the cylindrical reactor vessel from a wall of the cylindrical reactor vessel.

14. The device according to claim 7, wherein the reactor vessel has a cross section in the shape of a circle, wherein the circle has a plurality of tangents, and wherein each radiation source of the first set of radiation sources lies on one of the plurality of tangents.

15. The device according to claim 7, wherein an interior of the reactor vessel is free from obstructions that would interfere with the circular movement.

* * * * *